No. 729,080. PATENTED MAY 26, 1903.
H. J. MILLER.
ROAD CART.
APPLICATION FILED JAN. 3, 1900. RENEWED JAN. 13, 1903.
NO MODEL.
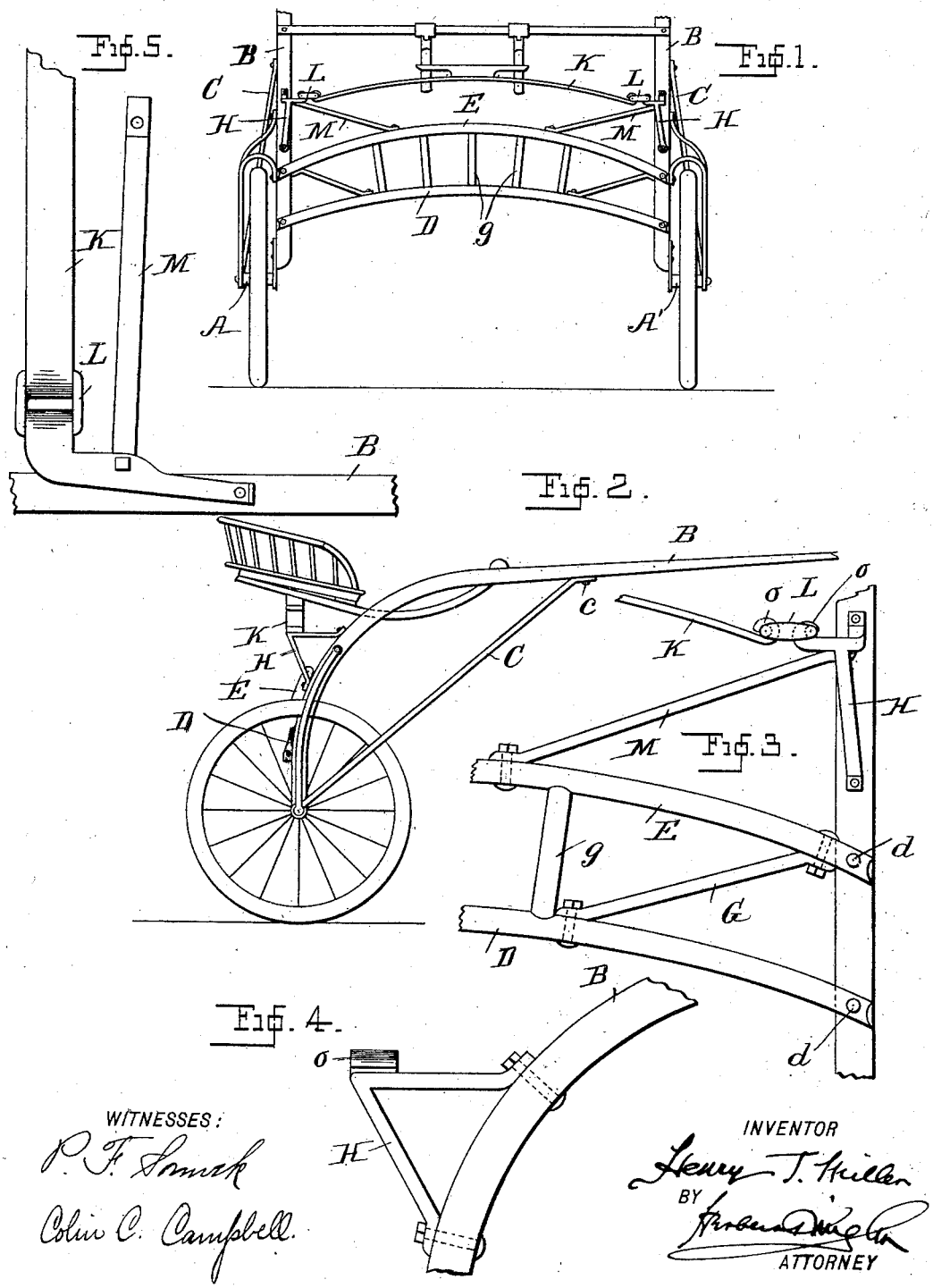

No. 729,080. Patented May 26, 1903.

UNITED STATES PATENT OFFICE.

HENRY J. MILLER, OF GOSHEN, NEW YORK, ASSIGNOR TO ARTHUR R. COATES AND JOSEPH S. COATES, OF GOSHEN, NEW YORK.

ROAD-CART.

SPECIFICATION forming part of Letters Patent No. 729,080, dated May 26, 1903.

Application filed January 3, 1900. Renewed January 13, 1903. Serial No. 138,828. (No model.)

*To all whom it may concern:*

Be it known that I, HENRY J. MILLER, a citizen of the United States, and a resident of Goshen, in the county of Orange and State of New York, have invented a new and useful Improvement in Speeding or Road Carts, of which the following is a specification.

My invention relates more particularly to what are known in the trade as "bicycle" or "rubber-tired" carts; and it consists in the present instance of an improved and more effectual framework for such a vehicle, the object being to secure the necessary strength, while preserving the requisite lightness for such a vehicle.

My invention consists also in the particular placing or the relative positions of the seat-supporting bar and the spring of the cart, whereby the easiness of riding is maintained and in fact improved and a better balance secured.

Referring to the accompanying drawings, which form a part of this specification, Figure 1 is an end elevation of my improved cart, the seat being removed. Fig. 2 is a side elevation showing the seat in place. Fig. 3 is a detail rear elevation of the truss and bracket hereinafter described and claimed. Fig. 4 is a detail side view of my improved bracket. Fig. 5 is a detail plan view of the spring and the spring-support.

In the drawings, A A' represent the axles or double axle of the cart, from which extend, curving upwardly and forwardly, the shafts B.

C represents braces which extend from the shafts at a point $c$ to the axles for strengthening the structure.

At D, I show my improved truss, formed of curved or arched pieces E F, attached at $d$ to the shafts B. At $g$ are metal braces extending between the upper and lower members of the truss. Separating-braces are also shown at $g$.

At H, I show a V-shaped bracket, attached at its terminals to the curved parts of the shafts and supporting at its apex the spring K through the medium of the link L. (See more particularly Figs. 3 and 5.) Both the spring and the brackets are provided with hooks O, which serve as means for securing the links and holding the spring to its proper relative positions.

At M, I show a brace extending from the bracket H to the upper member of the truss.

Over the spring K, centrally located, is the seat S. It is supported in such a place and in such a manner that the up-and-down movement when occupied by the driver will cause it to move in a vertical plane to the rear of the truss.

I thus secure all of the advantage and strength of truss and at the same time do not interfere with the comfort and convenience of the rider.

Having thus described my invention, what I claim as new therein, and desire to secure by Letters Patent, is—

The combination in a road or speeding cart, of brackets supported on the shafts relatively to the axle as shown, a transverse seat-supporting spring attached to and hung upon said brackets and located in a vertical plane to the rear of the axle, with said axle, and braces extending inwardly from the brackets at a point forward of the spring attachment and fixedly secured to the axle, as and for the purposes set forth.

HENRY J. MILLER.

Witnesses:
JOHN A. ELSTON,
BENJ. HULL.